United States Patent
Soto Montoya et al.

(10) Patent No.: US 9,527,770 B2
(45) Date of Patent: Dec. 27, 2016

(54) COMPOSITE MATERIAL BASED ON RICE HUSK AND BINDER, MODIFIED WITH CARBON NANOSTRUCTURES

(75) Inventors: Jose Antonio Soto Montoya, Corregidora (MX); Mauricio Martinez Alanis, Corregidora (MX); Daniel Ramirez Gonzalez, San Luis Potosi (MX)

(73) Assignee: Urbanizaciones Inmobilarias Del Centro S.A. DE C.V., Seccion, Quetaro (MX)

( * ) Notice: Subject to any disclaimer, the term of this patent is extended or adjusted under 35 U.S.C. 154(b) by 542 days.

(21) Appl. No.: 13/991,019

(22) PCT Filed: Dec. 1, 2011
(Under 37 CFR 1.47)

(86) PCT No.: PCT/MX2011/000147
§ 371 (c)(1),
(2), (4) Date: Nov. 13, 2013

(87) PCT Pub. No.: WO2012/074350
PCT Pub. Date: Jun. 7, 2012

(65) Prior Publication Data
US 2015/0005415 A1      Jan. 1, 2015

(30) Foreign Application Priority Data
Dec. 1, 2010   (MX) .................... MX/a/2010/013211

(51) Int. Cl.
| | | |
|---|---|---|
| *C09D 5/16* | (2006.01) | |
| *C09D 7/12* | (2006.01) | |
| *C04B 26/04* | (2006.01) | |
| *C04B 16/00* | (2006.01) | |
| *C04B 28/02* | (2006.01) | |
| *C04B 14/02* | (2006.01) | |
| *C04B 18/24* | (2006.01) | |
| *C04B 24/26* | (2006.01) | |
| *C04B 111/00* | (2006.01) | |

(52) U.S. Cl.
CPC ............ *C04B 26/04* (2013.01); *C04B 14/026* (2013.01); *C04B 16/00* (2013.01); *C04B 18/24* (2013.01); *C04B 24/2623* (2013.01); *C04B 28/02* (2013.01); *C09D 5/1681* (2013.01); *C09D 7/1266* (2013.01); *C09D 7/1291* (2013.01); *C04B 2111/00482* (2013.01); *Y02W 30/97* (2015.05)

(58) Field of Classification Search
CPC ... C09D 5/1681; C09D 7/1266; C09D 7/1291; Y02W 30/97; C04B 26/04; C04B 16/00; C04B 28/02; C04B 14/026; C04B 18/24; C04B 24/2623; C04B 2111/00482
USPC .......................................................... 524/5
See application file for complete search history.

(56) References Cited

U.S. PATENT DOCUMENTS

| | | | |
|---|---|---|---|
| 2003/0188669 A1* | 10/2003 | Sobolev .............. | C04B 40/0039 106/737 |
| 2009/0011207 A1* | 1/2009 | Dubey ................ | C04B 20/1051 428/219 |
| 2009/0229494 A1 | 9/2009 | Shah et al. | |

FOREIGN PATENT DOCUMENTS

| | | |
|---|---|---|
| CN | 101798466 A | 8/2010 |
| DE | 10 2007 013 467 A1 | 9/2008 |
| EP | 2 228 343 A1 | 9/2010 |
| WO | WO 2009/099640 A1 | 2/2009 |

OTHER PUBLICATIONS

Derwent Abstract for CN 101274831, Oct. 1, 2008.*
Han et al., Effects of CNT Doping Level and Water/Cement Ratio on the Piezoresistivity of CNTS/Cement Composites, ASME 2010 Conference on Smart Materials, Sep. 28-Oct. 1, 2010.
Cwirzen et al., Surface decoration of carbon nanotubes and mechanical properties of cement/carbon nanotube composites, Advances in Cement Research, 2008, vol. 20, No. 2.
Luo et al., Flexzural strengths and characteristics of cement-based composite reinforced with acid-treated multi-walled carbon nanotubes, Journal, 2008.
Sanchez et al., Nanotechnology in Concrete—A Review, Construction and Building Materials, 2010.
Musso et al., Influence of carbon nanotubes structure on the mechanical behavior of cement composites, Composites Science and Technology, May 2009.
Li et al., Mechanical behavior and microstructure of cement composites incorporating surface-treated multi-walled carbon nanotubes, Carbon, 2005.
Yu et al., A carbon nanotube/cement comosite with piezoresistive properties, Smart Materials and Structures, Mar. 30, 2009.
International Search Report and English translation, PCT/MX2010/000153, dated Jun. 1, 2011.
Written Opinion and International Search Report (Translation), Apr. 26, 2012, PCT/MX2011/000147.

* cited by examiner

*Primary Examiner* — Angela A Scott
(74) *Attorney, Agent, or Firm* — Cook Alex Ltd.

(57) ABSTRACT

Compound material based on water, cement, rice husk and polymeric resin modified with carbon nanostructures, in which variation of the ratios in which said components are combined together with production pressure and temperature results in a consistency suitable for said material to be used as paint, coating paste or panel-production conglomerate.

20 Claims, 9 Drawing Sheets

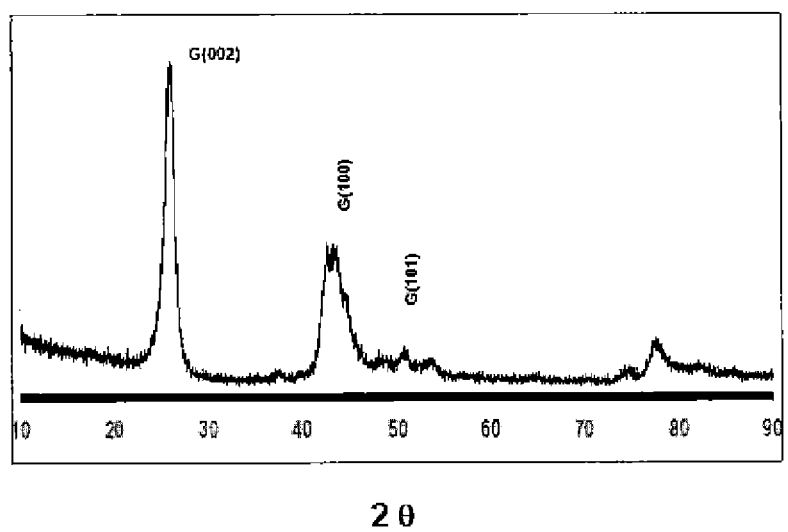
2 θ
FIG. 7
 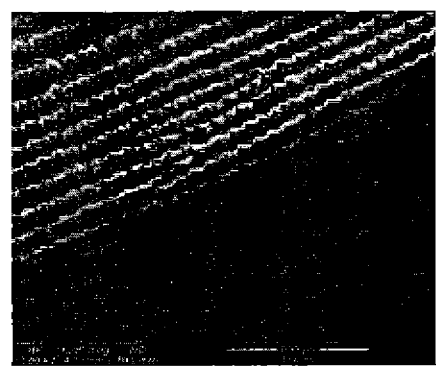
FIG. 8     FIG. 9

COMPOSITE MATERIAL BASED ON RICE HUSK AND BINDER, MODIFIED WITH CARBON NANOSTRUCTURES

FIELD OF THE DISCLOSURE

The present disclosure refers to material made of rice husk and binder, and more particularly to a material composed of rice husk with binders modified with carbon nanostructures

BACKGROUND

Rice is a food that is consumed in the entire earth and within its processing, it is necessary to remove the husk. Particularly, for each ton of uncollected rice a quarter of a ton of rice husks is produced, which is mostly treated as agricultural residue.

For example, in Mexico 337,250 tons of rice are produced yearly, which represents 84,312 tons of rice husks per year.

Due to the worldwide high production of rice, it is important to find applications of residue (husk), produced during its processing. Its high content of silica, its uniform thickness geometry and aspect relation, make it a material that is economically viable to work as load (filling material) in resin binder, similar to wood particles used in the manufacture of conglomerates. Within the manufacturing process of wood binders, the resin proportion used orders the mechanical resistance of the end product. That is, the greater the resin concentration, the greater the mechanical resistance and resultant production cost. From the nanostructure point of view, carbon nanotubes, besides other properties, are highly resistant and can cause significant increase on the mechanical properties of a material, if employed as support nanoload.

On the other hand, it is also known that the housing market is an important economic engine in any country, and Mexico is not an exception. The composition of a building destined for housing is very complex: it requires a great number of materials and labor from an assortment of specialties, as well as from the construction process chosen therefor. However, all these constructions have similar features regarding shape and behavior. All of them are composed of walls, and at least one horizontal component defined by systems of floors and ceilings.

We have noticed that wood and its conglomerates can be used within a full constructive system, from basic structure to finishing work. Notwithstanding, the ecological part and the cost from the distinct processes for treating the same can be very high, and negatively affect a generation of inexpensive or affordable housing, even when panels made of process residues and synthetic resin binding particles are generated.

Within this problem, we propose manufacturing cheaper products with better performance by combining four elements, namely agroindustrial residue materials, polymeric resins, cements and carbon nanostructures. On one hand, it has been shown that it is possible to mix resins with carbon nanotubes in order to achieve a better mechanical and driving performance. Furthermore, the rice husk (with or without thermal treatment) can become an inexpensive material because it is a waste, and thus it can be used to manufacture more inexpensive composite materials (conglomerates, pastes and paints) employing a carbon nanotube modified resin and a cement material (white cement and Portland gray cement are examples). These new compounds are conceived as construction materials, which are parts of the construction system due to their mechanical properties as well as materials for finishes allowing building of low cost housing.

The material of the present disclosure has advanced nanotechnology engineering, in addition to having as a base element an agricultural field residue produced in every region of the world, and its application as fodder is not possible. Thus, our solution is considered as having significant ecological contributions.

Silica oxide is present in the husk, and this is part of the composed or composite material for construction. Same does not represent any health risk since the silica is confined in the rice husk structure and the latter one is in turn inside the material polymeric matrix, eliminating the risk of detachment from said particles that may cause harm to people who may come into contact with the same.

By offering fireproof properties, the material of the present disclosure is considered an appropriate finish for places of massive concentration of people as fire-retardant, and this gives added value to housing where it is applied.

Since its constituents give it the property of not transmitting heat surrounding its side exposed to the outside (for having a micro scale porous structure and high silica content) it also passively participates in saving energy, including electric energy, to achieve comfort inside the building to which it is applied. We have found that the performance of a 3 mm thick paste is significantly superior than the performance of 2 inch thick polystyrene sheeting.

Likewise, the composed or composite material of the disclosure is made up of ecological materials and has the ability of being a wood substitute material for building houses and other buildings. Its contribution to the environment reaches an elevated impact since it stops using materials that indirectly generate high volumes of $CO_2$ during their manufacture.

In addition, we propose the mixing and pressing procedure of a cementing material with rice husk with or without thermal treatment, bound with carbon nanostructure modified polymeric resin as support load. The procedure allows that when varying the proportions between these materials, a conglomerate, paste or paint may be produced in order to incorporate it as a substitute and novel material in the existing construction systems.

Briefly, the rice husk material of the present disclosure can be used in the preparation of: paints, with fireproof properties, great mechanical resistance, and thermal and impermeable insulation properties; and pastes, to directly apply on walls as texturized finish, withy thermal isolating properties with thickness of 2 mm or more, fireproof properties and with mechanical resistance to stress and impermeable.

The present rick husk based material can also be used in the preparation of panels in different thicknesses and densities, with high bending, tension and compression mechanical properties, fireproof and thermal isolating properties, in addition to being resistant to constant hydrostatic pressures (with no thickness increase) for a long time and for its silica content also resistant to termites, while also presenting thermo-modeling properties.

BRIEF DESCRIPTION OF THE DRAWINGS

In order to understand better the disclosure, a description of the same is provided below, along with the accompanying drawings, in which:

FIG. 7 shows the diffractogram typical of white cement;

FIG. 8 shows a rice husk micrograph with a graphic scale of 3 mm;

FIG. 9 shows a rice husk micrograph with a graphic scale of 500 µm;

DETAILED DESCRIPTION

The loads employed for modifying the binder are carbon nanostructures known as multiple wall carbon nanotubes, which are almost cylindrical structures, composed of several graphite network concentric layers (hexagonal network of carbon atoms covalently linked to each other). It should be emphasized that the carbon-carbon link is one of the most resistant ones existing in nature. However, some of the carbon atoms of the hexagonal networks can be replaced with other functional elements or groups making these tubes be more reactive with molecules, polymers and external agents, and their interactions with different matrixes are higher. Within the groups or elements that can replace carbon atoms N, P, O, S, Si, B, Se, etc., can be mentioned, or rather the functionalization with —OH, —OOH or OH-type groups.

Figure 1:
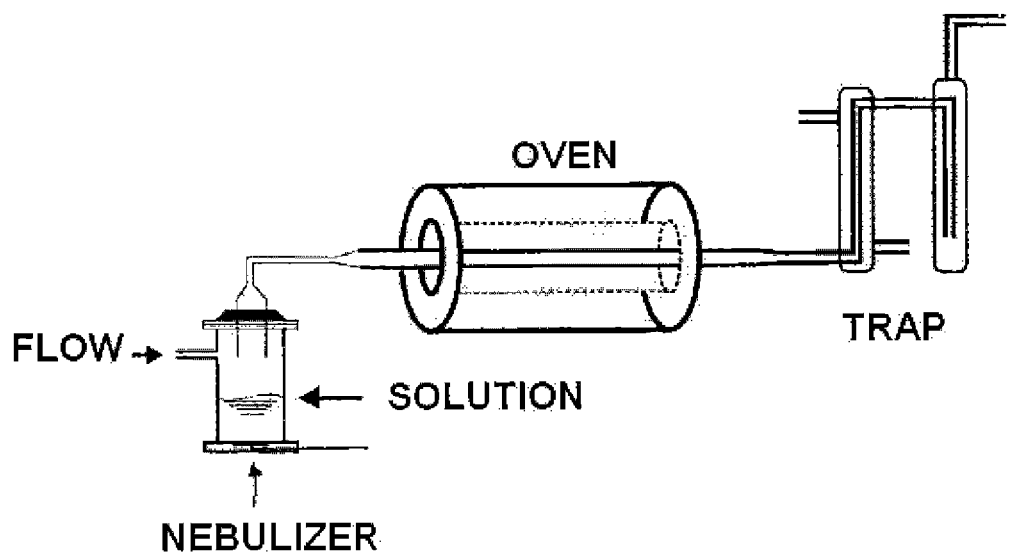
FIG. 1 shows a diagram of the process for the synthesis of carbon nanostructures, employing aerosol-assisted chemical vapor deposition (AACVD)

The dimensions of the multiple layer carbon nanotubes, employed in this work have average lengths of 800 µm and diameters of 30-70 nm, and were synthesized with the AQACVD (Aerosol Assisted Chemical Vapor Deposition) method, which employs a solution containing the carbon source (for example, hydrocarbon) and a metallic catalyst used for promoting the growth of tubular nanostructures (for example, transition metals such as Ni, Fe and Co). This solution is stirred with ultrasound in order to generate microbeads of this mixture (FIG. 1), and by means of the inert gas flow is transported through a quartz pipe to the high temperature reactors where its decomposition and subsequent growth of the nanotubes occurs.

Other important aspects of the nanotubes produced in the present disclosure are: reactivity, caused by the controlled presence of atoms other than carbon (doping) or by functional groups, which allows a better interaction between the carbon nanotube and the matrix in question to manufacture the compound with nanotubes; the high crystallinity degree of the nanotubes; and the high purity of nanotubes (absence of non-tubular particles and amorphous carbons).

Figure 2:
FIG. 2 shows an electronic scanning microscope image of carbon nanotubes used in the present disclosure.
Figure 3:
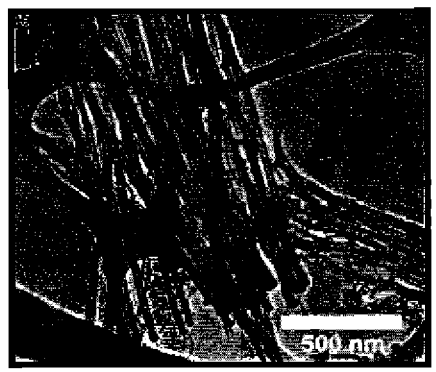
FIG. 3 illustrates a high-resolution transmitting electronic microscope image (with a graphic scale of 500 nm), revealing the carbon nanostructure internal structure used in the present disclosure.
Figure 4:
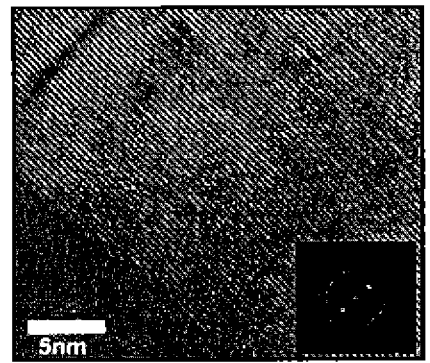
FIG. 4 illustrates a high-resolution transmitting electronic microscope image, revealing the carbon nanotube internal structure and crystallinity to greater resolution (with a graphic scale of 5 nm) than the image of FIG. 3.
Figure 5:
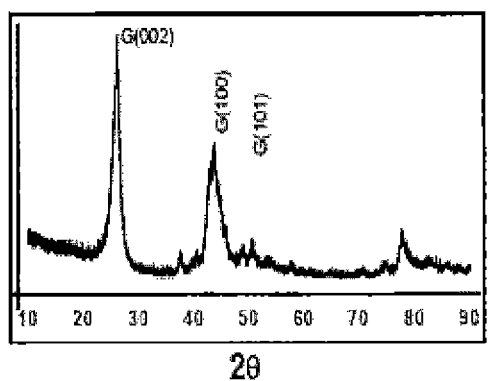
FIG. 5 shows the X-ray pattern of the nanotubes used in the present disclosure.
Figure 6:
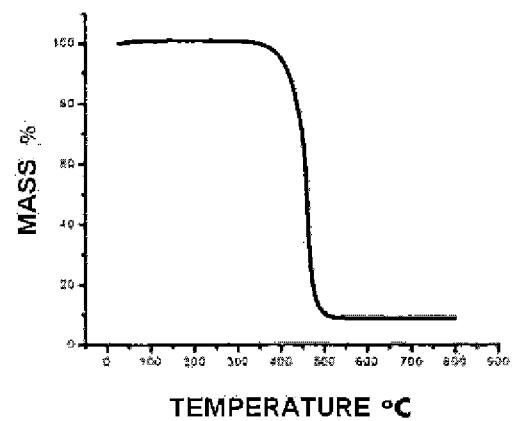
FIG. 6 shows a mass revolution graph in relation to the temperature in the thermogravimetric analysis of the nanostructures used in the present disclosure.
Figure 10:
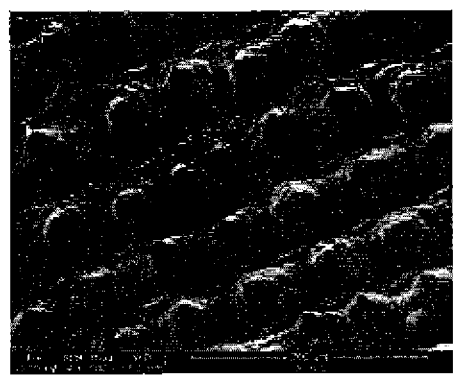
FIG. 10 shows a rice husk micrograph with a graphic scale of 200 µm.
Figure 11:
FIG. 11 shows a rice husk micrograph with a graphic scale of 50 µm.

In FIGS. 2 and 3, which correspond to electronic scanning microscope images, the purity of the nanostructures and their morphology can be noticed. In FIG. 4, corresponding to a high-resolution transmitting electronic microscope image, the internal structure and crystallinity of the nanostructures are revealed, as well as the diameters. In FIG. 5, the crystallinity of the nanotubes can be confirmed. In FIG. 6, the absence of amorphous material is confirmed, as well as purity, since this shows the mass evolution in relation to the temperature in thermal gravimetric analysis in the air.

Another loading or charging element in the synthesis of composite material based on rice husk, is the use of white cement, such being a variant of the Portland cement, but with a lower percentage of $Fe_2O_3$. Its aspects regarding mechanical resistance are similar to the gray cement, but with a lower forge time. Same is more reactive and thus requires a greater moisture percentage. In FIG. 7, a typical diffractogram of white cement is shown.

The role of white cement is to interact along with the modified binder, as an additional binding element in the material, thus providing a better performance in highly humid environments, as well as a greater integration in surfaces relative to concrete and to speed up the drying process of the material.

The present disclosure takes advantage of the mechanical properties of the doped and functionalized carbon nanotubes, in order to significantly increase the mechanical properties of one compound that is used in manufacturing rice husk conglomerates, paints, pastes or panels in the construction field.

The key point of the present disclosure centers on the interaction of active sites in the surface of the carbon nanotubes (doping), and takes advantage of the aspect ratio (length/diameter) of these nanotubes (between 30,000 and 50,000).

The base component for producing the composed or composite material is the rice husk, which is a by-product of agroindustrial activities, and which cannot be used as forage, in addition to being a substitute for base materials of cellulose and other natural fibers.

For the characterization or morphological and chemical analysis of the materials used in this disclosure, electronic scanning microscope studies and elemental analysis were carried out using X-ray energy dispersion, as it is shown in FIGS. 8 to 18. In the micrographs of FIGS. 8 to 11, it can be generally noticed the surface of whole husks presented in a regular pattern of periodic "pyramidal" periodic arrays, the base mean size is 40 $\mu m^2$ and with a regular separation between them of approximately 80 $\mu m$, which favor linking points or bonding sites with the modified resin.

Figure 12:
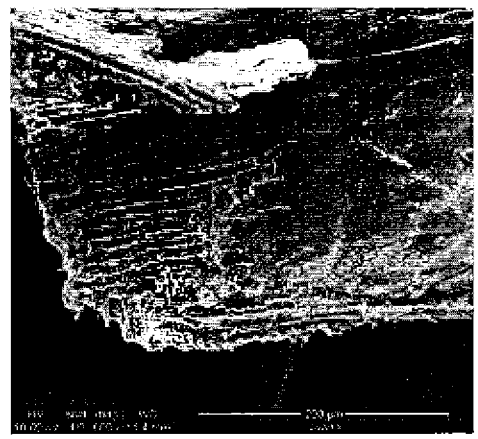
FIG. 12 shows a micrograph of the rice husk internal structure with a graphic scale of 200 µm.
Figure 13:
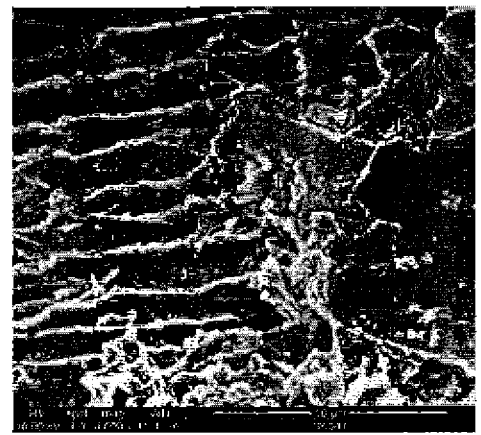
FIG. 13 shows a micrograph of the rice husk internal structure with a graphic scale of 50 µm.

In FIGS. 12 and 13, the internal structure of the rice husk is observed, constituted by parallel channels throughout the body. The channel diameter is closer to 10 $\mu m$.

In the Table I below the elemental quantification is shown, presented in weight percentage and atomic percentage, which reveals that $SiO_2$ composes more than 50% of the rice husk.

TABLE I

| Element | Wt % | At % |
|---------|------|------|
| C K | 28.49 | 39.53 |
| O K | 40.21 | 41.89 |
| Si K | 31.31 | 18.58 |

Figure 14:
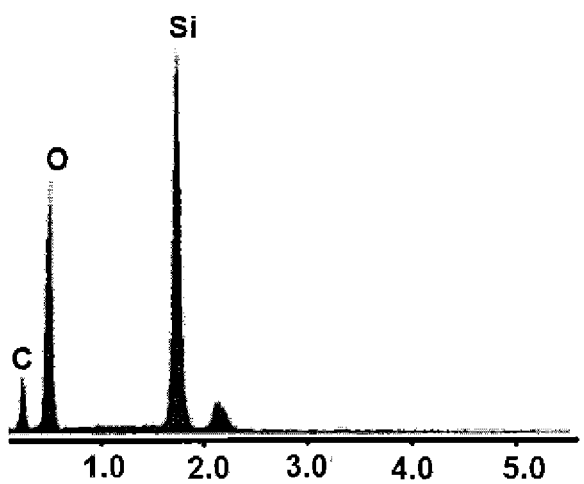
FIG. 14 is an image showing a spectrum with the signals associated with the chemical elements present in the rice husk surface.

In FIG. 14 the spectrum is shown by signals from the elements found in the surface of the rice husk.

Figure 15:
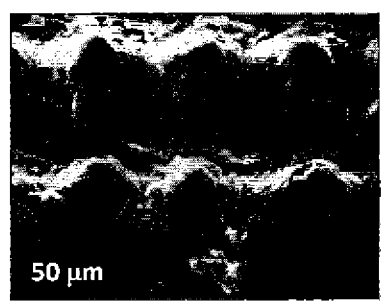
FIG. 15 is an image showing an analysis region of the rice husk surface.
Figure 16:
FIGS. 16, 17 and 18 are part of a mapping of more plentiful chemical elements in the rice husk.
Figure 17:
Figure 18:

In FIGS. 15 to 18, the elemental mapping analysis is shown of a random region in the rice husk surface. In FIG. 15 the analysis region is shown, while for each one of the images of FIGS. 16 to 18 it is generated from the punctual energy detection matrix for Si, O and C.

The combination of the properties of each one of the blocks makes space for obtaining a material composed of special features translated into a better mechanical and driving performance as the conventional materials.

Figure 19:
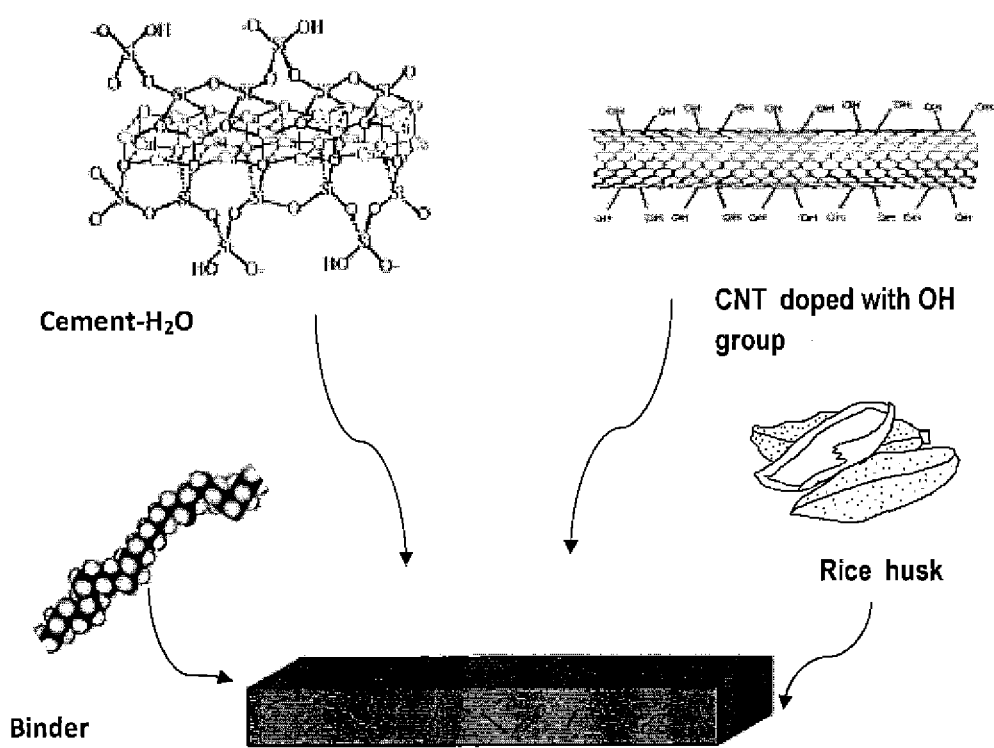
FIG. 19 is a concept diagram showing the components of the composed material of the present disclosure.

In FIG. 19 the concept about the nanostructured composed or composite material of the present disclosure is represented, whose properties offer a better performance than similar natural fiber-based materials and a lower environmental impact compared to that of similar synthetic fiber-based materials. Said composed or composite material is constituted by cement, water, doped carbon nanostructures with N, P, O, S, Si, B, Se, Fe, Co, Ni, Ag, Au, Pd, Pt, etc., or well functionalization with —OH, —OOH or OH-Type groups, thermally or acidly treated to cause defects in its graphite network, rice husk and the binder or polymeric resin.

The elaboration process of the material of the present disclosure starts with mechanical grinding of the rice husk to achieve a particle size between 100 nm up to 2 mm.

Figure 20:
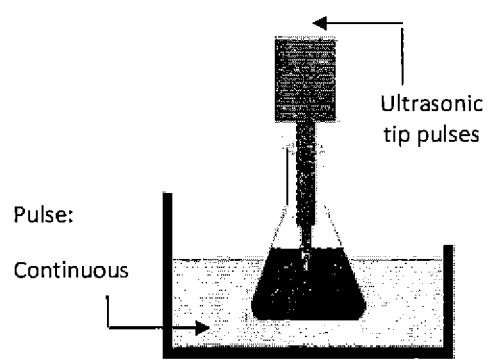
FIG. 20 is a scheme of the simultaneous ultrasound dispersion process.
Figure 21:
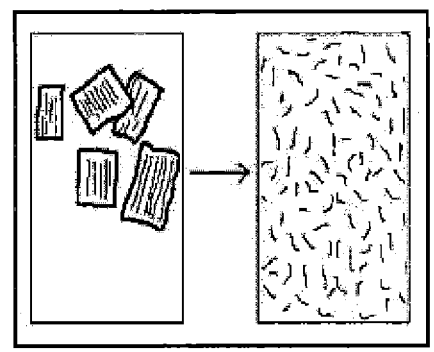
FIG. 21 is a scheme result of the ultrasound dispersion of the means carbon nanostructures.
Figure 22:
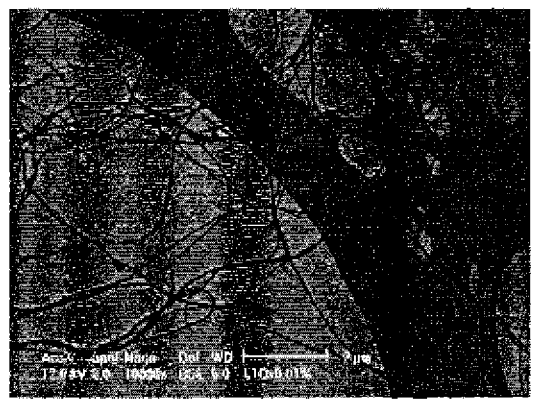
FIG. 22 is an image showing the carbon nanotubes after ultrasound dispersion with a graphic scale of 2 µm.

On the other hand, the process for modifying the binder was a follows: dispersion of the carbon nanostructures through an ultrasound dispersion process, with one end or one coat (see FIG. 20). FIG. 21 shows on the left side the binder and the carbon nanotubes before the dispersion, and on the right side the dispersion result is shown. The dispersion can also be seen in the image of FIG. 22.

The nanostructures are subsequently incorporated (previously dispersed) in the binding matrix at a controlled temperature, using the electro-mechanical blender to obtain a better distribution of the nanometric loads in the matrix. Load percentages of carbon nanostructures were used from 0.001% up to 10% by weight, in relation to the binder.

Figure 23:
FIG. 23 is an image of the raw binder.
Figure 24:
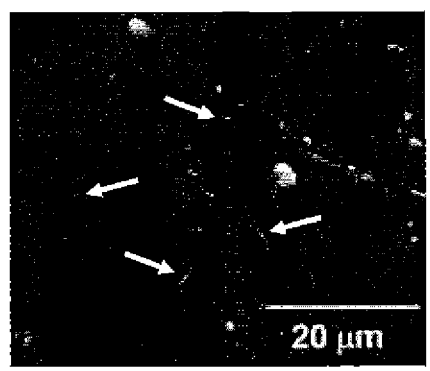
FIG. 24 is an image of the binder reinforced with carbon nanotubes.

The binding matrix is of polymeric type, for example, polyvinyl acetate or the like. In FIGS. 23 and 24 a difference can be noted between one pure resin and one resin modified with carbon nanostructures (see arrows indicating the carbon nanotube dispersion), respectively.

Figure 25:
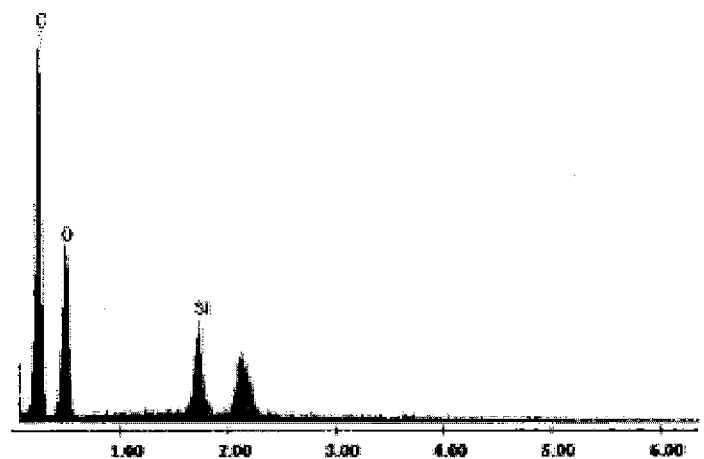
FIG. 25 shows an image of the compound including husk, cement, resin and a homogeneous dispersion of the carbon nanostructures.

FIG. 25 shows the X-ray energy dispersion spectrum wherein it is determined that the main constituents of the composed material are according to the following TABLE II:

TABLE II

| Element | Wt % | At % |
|---------|------|------|
| C K | 64.3 | 71.89 |
| O K | 30.55 | 25.65 |
| Si K | 5.15 | 2.46 |

Figure 26:
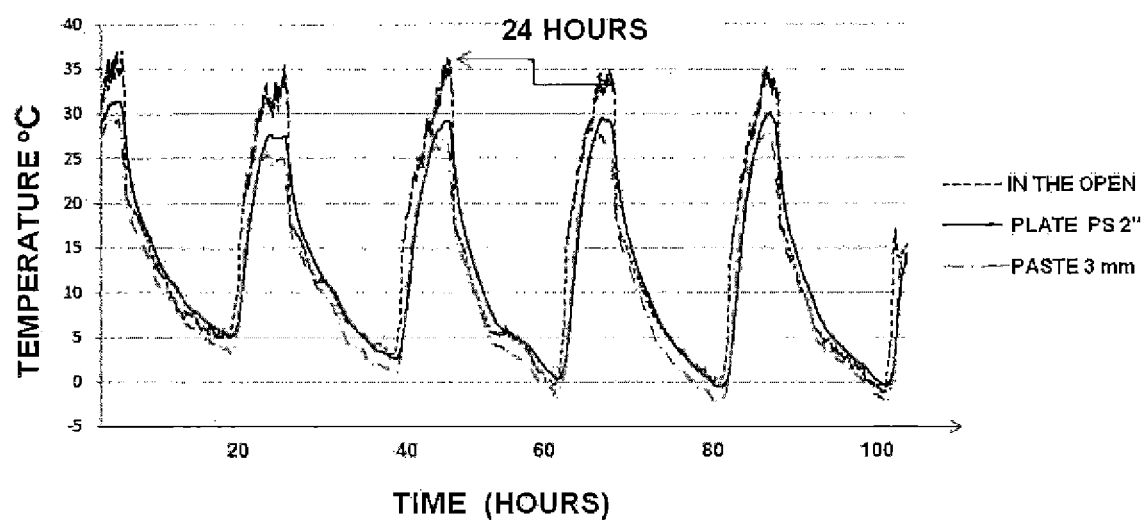
FIG. 26 is a comparative graph of mean temperature in the devices coated with polystyrene of 2 inches thick, against another one coated with paste of 3 mm thick of our composition and with the outside temperature as reference.

In FIG. 26 it can be noticed that the material of the present disclosure has a better performance when comparing it to a 2 inch polymeric polystyrene plate or sheet, the graph showing that there is at least a 4° difference between the internal temperature from the measurement device exposed to the outside coating with 3 mm of paste from the material of this disclosure, and another 2 inch thick polystyrene coating, both well below the measured outside temperature right on the side of the used devices ("in the open" control).

The main purpose of incorporating carbon nanostructures is to increase the resin or binder performance, through which they will transfer their mechanical, electrical and thermal properties during the polymerization, having as a result a support network in the binding polymer with better properties.

Generally, the procedure for preparing the material of the present invention is as follows: (1) Mixing processed rice husk with modified resin; (2) Measuring out the white cement load; and (3) Homogenizing the previous mixture with electromechanical means.

The variations in percentages of the materials and conditions to achieve different formulations of the compound are as follows for three formulations. The percentages refer to the processed husk mass [m].

Conglomerate: the proportions are processed husk (m); white cement (20% to 80% m); modified resin with nanostructure load (1% to 150% m); and water (0% to 10% m). The pressure is 1 to 40 $kg/cm^2$, and the temperature is 18 to 25° C.

Regarding the preparation of the paste: the proportions are processed husk (m); white cement (20% to 80% m); resin modified with nanostructure load (100% to 300% m); and water (10% to 50% m). The pressure is 0 $kg/cm^2$, and the temperature is 18 to 25° C.

In regards to the preparation of the paint: the proportions are processed husk (m); white cement (20% to 80% m); resin modified with nanostructure load (100% to 300% m); and water (10% TO 50% M). The pressure is 0 $kg/cm^2$, and the temperature is 18 to 25° C.

The main difference between the three presentations or formulations is the amount relative to each one of their components, water, resin modified with carbon nanostructures, rice husk, white cement, pressure and temperature. Otherwise, the manufacturing process is similar for all.

The material composed in its distinct presentations was submitted to hydrostatic pressure tests during a period of time greater than 40 hours, without recording permeability.

The material composed or compounded in its distinct presentations was submitted to direct flame fuel tests, showing fireproof properties of the compositions of the disclosure, properties that are not exhibited by conventional wood products (three-ply, boards, commercial binders, etc.).

The paste-type composed or compounded material was used to coat a clear material cube, and it was placed outside next to a similar coating with 2 inch polystyrene sheets during more than 100 continuous hours. The respective interior temperatures of the respective devices were recorded, and they were compared to temperatures registered from the outside. An ability of thermal isolation was observed to be significantly higher than the one of the 2-inch polystyrene when the paste is painted white (see FIG. 26).

The conglomerate-type composed or composite material was submitted to a bending mechanical test to 3 points, determining the increase percentage in the performance of the material test tubes of the disclosure in relation to those of the reference. It was concluded that the use of carbon nanostructures as support in the resin, as well as the use of white cement, is translated into a 54% increase in bending mechanical resistance.

The present invention has been disclosed in its preferred embodiment; however, it will be obvious for those skilled in the art that a great variety of changes and modifications to this invention can be made, without departing from the scope of the following claims.

The invention claimed is:

1. A composite material or composition comprising rice husk, binder modified with carbon nanostructures, water, and cement, wherein carbon atoms of the carbon nanostructures are replaced with replacement components selected from the group consisting of functional groups and elements other than carbon.

2. The composite material or composition in accordance with claim 1, wherein the binder is a polymeric resin.

3. The composite material or composition in accordance with claim 2, wherein the polymeric resin is polyvinyl acetate.

4. The composite material or composition in accordance with claim 3, wherein the cement is white cement, and the rice husk, polyvinyl acetate modified with carbon nanostructures and white cement are homogenized into the composition.

5. The composite material or composition in accordance with claim 1, wherein the replacement component element other than carbon is selected from the group consisting of N, P, O, S, Si, B, Se, Fe, Co, Ni, Ag, Au, Pd and Pt.

6. The composite material or composition in accordance with claim 1, wherein the replacement component functional group is selected from the group consisting of —OH and —OOH groups.

7. A compressed conglomerate composition comprising rice husk, binder modified with carbon nanostructures, water, and cement, wherein carbon atoms of the carbon nanostructures are replaced with replacement components selected from the group consisting of functional groups and elements other than carbon.

8. The compressed conglomerate composition in accordance with claim 7, wherein the binder is a polymeric resin.

9. The compressed conglomerate composition in accordance with claim 8, wherein the polymeric resin is polyvinyl acetate.

10. The compressed conglomerate composition in accordance with claim 9, wherein the cement is white cement, and the rice husk, polyvinyl acetate modified with carbon nanostructures and white cement are homogenized into the composition.

11. The compressed conglomerate composition in accordance with claim 7, wherein the replacement component other than carbon is selected from the group consisting of N, P, O, S, Si, B, Se, Fe, Co, Ni, Ag, Au, Pd and Pt.

12. The compressed conglomerate composition in accordance with claim 7, wherein the replacement component functional group is selected from the group consisting of —OH and —OOH groups.

13. A paint composition for surfaces or a paste composition for coating surfaces comprising rice husk, binder modified with carbon nanostructures, water, and cement, wherein carbon atoms of the carbon nanostructure are replaced with replacement components selected from the group consisting of functional groups and elements other than carbon.

14. The composition in accordance with claim 13, wherein the binder is a polymeric resin.

15. The composition in accordance with claim 14, wherein the polymeric resin is polyvinyl acetate.

16. The composition in accordance with claim 15, wherein the cement is white cement, and the rice husk, polyvinyl acetate modified with carbon nanostructures and white cement are homogenized into the composition.

17. The composition in accordance with claim 13, wherein the replacement component other than carbon is selected from the group consisting of N, P, O, S, Si, B, Se, Fe, Co, Ni, Ag, Au, Pd and Pt.

18. The composition in accordance with claim 13, wherein the replacement component functional group is selected from the group consisting of —OH and —OOH groups.

19. A method for manufacturing construction composites, comprising:
    providing carbon nanotubes with carbon atom sites in their carbon chain replaced by a replacement component selected from the group consisting of a functional group and an element other than carbon;
    modifying a polymeric resin binder by dispersing in the binder the carbon nanotubes having the replacement component to provide modified polymeric resin binder; and
    mixing ground rice husk with the modified polymeric resin binder, adding cement, and homogenizing the rice husk, the modified polymeric resin binder, the cement and water to form the construction composites.

20. The method in accordance with claim 19, wherein the replacement component element other than carbon is selected from the group consisting of N, P, O, S, Si, B, Se, Fe, Co, Ni, Ag, Au, Pd and Pt, and wherein the replacement component functional group is selected from the group consisting of —OH and —OOH groups.

* * * * *